Feb. 23, 1971 W. THELEN 3,566,284

ACTIVE RC WAVE TRANSMISSION NETWORK HAVING A 360° NON-MINIMUM PHASE TRANSFER FUNCTION

Filed Dec. 29, 1967 3 Sheets-Sheet 1

INVENTOR
W. THELEN
BY R. B. Ardis
ATTORNEY

Feb. 23, 1971 W. THELEN 3,566,284

ACTIVE RC WAVE TRANSMISSION NETWORK HAVING A 360° NON-MINIMUM PHASE TRANSFER FUNCTION

Filed Dec. 29, 1967 3 Sheets-Sheet 3

United States Patent Office 3,566,284
Patented Feb. 23, 1971

3,566,284
ACTIVE RC WAVE TRANSMISSION NETWORK HAVING A 360° NON-MINIMUM PHASE TRANSFER FUNCTION

William Thelen, Salem, N.H., assignor to Bell Telephone Laboratories, Incorporated, Murray Hill, N.J., a corporation of New York
Filed Dec. 29, 1967, Ser. No. 694,498
Int. Cl. H03k 5/20
U.S. Cl. 328—155 18 Claims

ABSTRACT OF THE DISCLOSURE

In a resistance-capacitance transmission network the input signal is first applied to two separate filter networks both of which have positive transfer functions. One of the networks is passive and has a first order transfer function whereas the other network is active and has a second order transfer function. The individual outputs of the filter networks are subtracted from each other in a subtracting circuit which may take the form of a differential amplifier. The resulting output signal has a 360° nonminimum phase transfer function without having required any inductors in the wave transmission network.

BACKGROUND OF THE INVENTION

This invention relates to active wave transmission networks and, more specifically, to active RC wave transmission networks having 360° nonminimum phase transfer functions.

In certain circuit applications, particularly in the area of wave equalization, it is necessary to operate on the phase characteristics of the signal being processed to obtain or maintain predetermined phase relationships. Phase shift networks are therefore introduced in the signal transmission path to delay the signal in a predetermined manner to obtain the required phase relationship. In order to obtain the greatest phase shift versatility such phase shift networks should have 360° nonminimum phase transfer characteristics in order to provide delay slopes—that is, the second derivative of the network's phase with respect to frequency—which are capable of being positive and negative as well as zero for different portions of the frequency spectrum. When it is required that the phase operations be performed without affecting the signal amplitude shape, a special type of nonminimum phase network, that is, one having an all-pass transfer function, is used to introduce the necessary phase shift without attenuating the signal.

Although prior art 360° nonminimum phase networks have had these operationally advantageous characteristics, they have heretofore had one particularly serious drawback; that is, they either required the use of both capacitors and inductors or they were limited to active shaping networks having a negative transfer function. The necessity to employ inductors, while generally undesirable, is especially limiting when the networks are to be used in integrated circuits. The requirement that the active shaping networks have negative transfer functions, i.e., the transfer functions are comprised of the ratio of two polynominals with positive coefficients together with a negative coefficinet as multiplier, entirely excludes certain classes of networks from such phase shift applications.

It is therefore a primary object of the invention to simplify 360° nonminimum phase networks.

Another object of the invention is to eliminate the requirement for inductors in 360° nonminimum phase networks.

A further object of the invention is to provide for 360° nonminimum phase networks which utilize shaping networks having a positive transfer function.

SUMMARY OF THE INVENTION

To fulfill these objects of the invention two input signal components of the same polarity are subtracted from each other to produce a difference signal which has the desired 360° nonminimum phase transfer characteristics without making it necessary to use any inductors in the circuit and without being limited to networks having a negative transfer function.

More specifically, in one embodiment of the invention the signal to be operated on is fed through two separate, individual paths to the negative and the positive input terminals, respectively, of a differential amplifier which performs the signal subtraction. While the first path to the negative input terminal comprises only a passive RC network, the second input directed to the positive input terminal is routed through an active RC shaping network which, in turn, is comprised of the tandem combination of a passive RC filter network and a noninverting isolation amplifier. Since the transfer function of the passive RC network is positive and since the noninverting isolation amplifier does not change the sign of the coefficients of the transfer function, the transfer function of the active shaping network is consequently also positive. The resulting transfer function has either band-pass or band-elimination characteristics depending upon the characteristics of the particular passive RC network which is used. The individual signals, modified in accordance with the characteristics of the networks in their particular path, are applied to the negative and positive differential inputs of the differential amplifier and, together with a negative feedback signal, provide the 360° nonminimum phase transfer characteristics for the wave transmission network without making it necessary to use inductors in the network.

DETAILED DESCRIPTION

Figure 1:
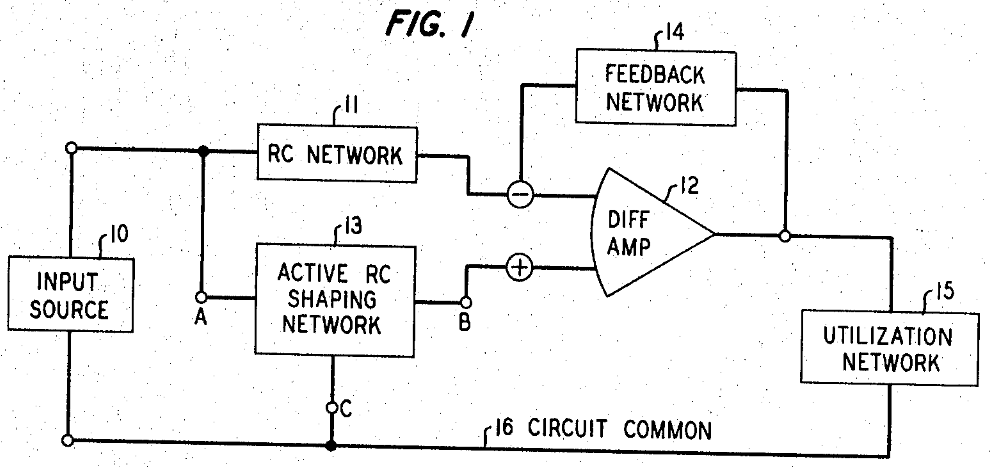
FIG. 1 is a block diagram of one embodiment of the invention.

In the wave transmission network illustrated in FIG. 1 of the drawing the input signal to be operated on is furnished by input source 10. One portion of the input signal which has predetermined amplitude and phase characteristics is fed through RC network 11 to the negative input terminal of differential amplifier 12, while another portion of the input signal is supplied through active RC shaping network 13 to the positive input terminal of differential amplifier 12. A feedback network 14 is connected between the output and the negative input terminal of differential amplifier 12, while the output of differential amplifier 12 is applied to utilization network 15. A common circuit connection 16 provides for the return paths between the individual circuits of the wave transmission network.

In the operation of the embodiment of the invention illustrated in FIG. 1 the signal furnished by input source 10 is operated on by the wave transmission network in order to modify and to supply to utilization network 15 an output signal which has the amplitude and phase characteristics required by the particular network application. Input source 10 may, for instance, represent part of a transmission line in which the transmission signal is subjected to undesired amplitude and phase effects which are to be compensated for in the wave transmission network of the present invention. That is, in the wave transmission network illustrated in FIG. 1 the signal may be subjected to specific, predetermined amplitude and phase changes to accomplish the necessary compensation. In the special case in which only the phase of the transmitted signal is to be changed, the transfer function of the wave transmission network is designed to have all-pass characteristics; that is, predetermined phase adjustments may be accomplished on the signal without changing the amplitude characteristics of the signal.

A special feature of the present invention is the capability to produce 360° nonminimum phase-shift networks without requiring any inductors in the circuit. Another advantage of the embodiment of the present invention is the utilization of a certain class of passive RF filter networks which heretofore were excluded because of their positive transfer characteristics.

Figure 2:
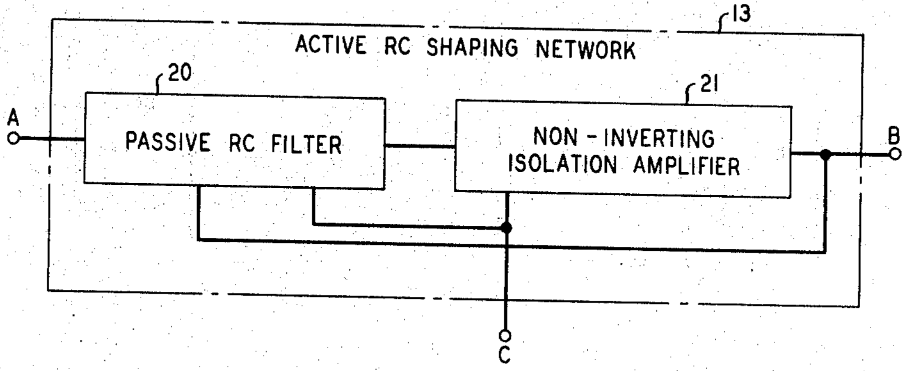
FIG. 2 is a block diagram of an active RC shaping network which can be used in the embodiment of the invention illustrated in FIG. 1.

In order for the wave transmission network to produce the required 360° nonminimum phase transfer characteristics active RC shaping network 13 takes the form illustrated in FIG. 2; that is, it is comprised of a passive RC filter 20 and a noninverting isolation amplifier 21. Filter 20 and amplifier 21 are connected in tandem by connecting the output of filter 20 to the input of amplifier 21. The input terminal of filter 20 is the input of network 13, while the output of amplifier 21 is the output of network 13. Filter 20 and amplifier 21 each have one connection to circuit common of the wave transmission network via terminal C of network 13. The feedback connection between the output of amplifier 21 and filter 20 shown in FIG. 2 makes it possible for active RC shaping network 13 to realize a transfer function which may have complex poles either by themselves or in addition to negative real poles. Without the feedback connection and using the same RC filter as used with the feedback connection, on the other hand, the transfer function of active shaping network is restricted to negative real poles.

Figure 6:
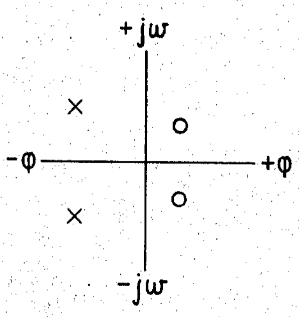
FIG. 6 is a pole-zero diagram in the complex frequency plane of a typical network having a 360° nonminimum phase transfer characteristic.
Figure 7:
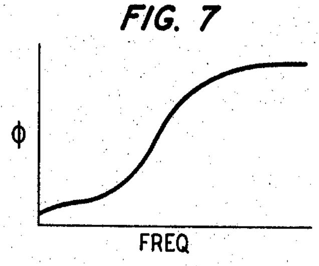
FIGS. 7 and 8 are curves of the phase and delay characteristics, respectively, of a 360° nonminimum phase network.
Figure 8:
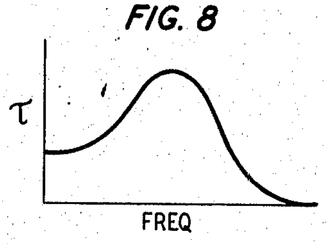

FIG. 6 illustrates the pole-zero location in the complex frequency plane of a typical, simple network having a 360° nonminimum phase transfer function. FIGS. 7 and 8 represent the phase and delay characteristics, respectively, of the network of FIG. 6. Of particular importance is the shape of the delay curve of FIG. 8 which illustrates the possibility of having increasing as well as decreasing rates of delay which is characteristic of a 360° nonminimum phase-shift network.

Figure 9:
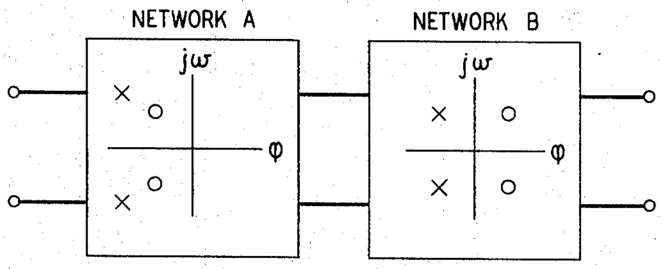
FIG. 9 illustrates a prior art method of obtaining a 360° nonminimum phase network by combining two networks A and B each having distinct, separate pole-zero characteristics.

One specific advantage of the wave transmission network of the present invention is the one-step method of design. That is, the entire network is one design block which produces the required phase and amplitude characteristics as a unity. One prior art approach to obtain a 360° nonminimum phase transfer function network required the design of two separate networks A and B having characteristics illustrated in FIG. 9. By cascading the two networks A and B the desired, combined characteristics as illustrated in FIG. 6 resulted, since the poles of passive network B cancel the zeros of pasisve network A. Distinct disadvantages of this last approach are twofold, namely, (1) two separate design efforts are necessary and (2) the networks require the use of inductors, the latter requirement being totally unacceptable for networks to be used in integrated circuits.

Figure 10:
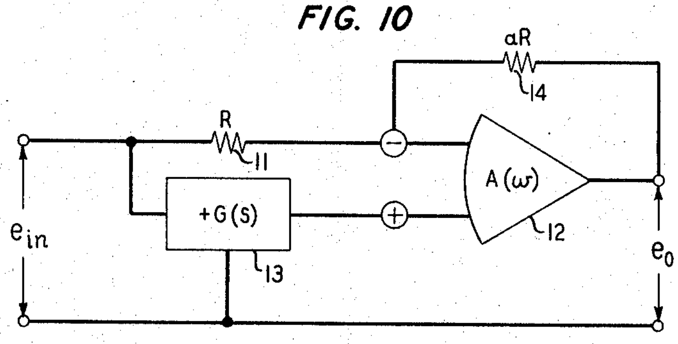
FIG. 10 is a mathematical model of a 360° nonminimum phase wave transmission network which is used to derive the required design equations for the embodiment of the present invention.

In order to derive the design equations for the 360° nonminimum phase network of the present invention, the simplified mathematical model of the network as illustrated in FIG. 10 will be utilized. Components in FIG. 10 equivalent to those of FIG. 1 have been given identical numerical designations. That is, resistor having a resistance R replaces RC network 11, an operational amplifier having an open loop gain $A(\omega)$ takes the place of differential amplifier 12, a network having a transfer function $+G(s)$ represents active RC shaping network 13, and a resistor of resistance $a$R simulates feedback network 14. In the above mathematical model the gain A of the operational amplifier is a funciton of the angular frequency $\omega$, the resistance of resistor $a$R is related by the constant $a$ to the resistance of resistor R, and transfer function $+G(s)$ is the open circuit transfer function which, in turn, is a function of the complex frequency $s=\gamma+j\omega$ having $\gamma$ as its real and $j\omega$ as its imaginary components and is comprised of a ratio of two polynominals with positive coefficients together with a positive coefficient as multiplier as designated by the + sign. Input voltage $e_{in}$ has been substituted for input source 10 and voltage $e_o$ simulates the output voltage of the network as applied to utilization network 15. The following transfer function may be derived for the model network illustrated in FIG. 10:

$$\frac{e_0}{e_{in}}=-\left(\frac{a}{1+\frac{a+1}{A(\omega)}}\right)\left[1-\left(1+\frac{1}{a}\right)G(s)\right] \quad (1)$$

In order for the circuit to be stable, the following conditions—which can be satisfied by standard design procedures and can be checked by the conventional phase and gain margin approach—must exist:

$$-A(\omega)\#a+1 \quad (2)$$

and G($s$) is stable

Once the stability conditions have been satisfied, a constant equal to $k_1$ may be introduced in Equation 1 to replace the terms:

$$\frac{a}{1+\frac{a+1}{A(\omega)}} \quad (3)$$

thereby producing the following simplified transfer function:

$$\frac{e_0}{e_{in}}=-k_1\left[1-\left(1+\frac{1}{a}\right)G(s)\right] \quad (4)$$

in which the constant $k_1$ may be neglected for present design purposes so that $$\left[1-\left(1+\frac{1}{a}\right)G(s)\right] \quad (5)$$

remains as the important circuit function which may also be expressed as:

$$\left[1-\left(\frac{a+1}{a}\right)G(s)\right] \quad (6)$$

In the instant invention the desired network is to have a 360° nonminimum phase transfer function which may be represented by a polynominal of the second degree. Consequently, Equation 6, that is, the circuit function of the network to be designed, has to be equal to such polynominal which represents the 360° nonminimum phase transfer function. The identity which is formulated by equating the polynominal with Equation 6 can then be solved for $G(s)$ to determine the general form which $G(s)$ will take.

Figure 11:
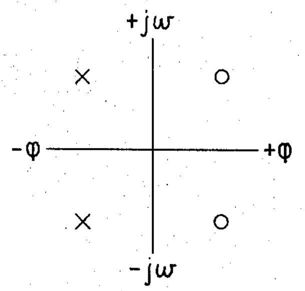
FIG. 11 is a pole-zero diagram in the complex frequency plane of one embodiment of the invention which has a 360° all-pass transfer function.

$G(s)$ may, in its most general form, be solved for any one of an unlimited number of nonminimum phase networks. The solution is, however, of particular interest in the special case when the 360° nonminimum phase network assumes all-phase characteristics. That is, the zeros in the complex frequency plane all lie in the right-half plane and are the negatives of the poles which must inherently lie in the left-half plane. The absolute value of the transfer function of such all-pass networks, that is, its gain, is constant for all frequencies while the phase angle, however, varies as a function of frequency. Consequently, such an all-pass network may be used to affect the phase or delay of a signal without introducing any signal attenuation. FIG. 11 illustrates in the complex frequency plane the pole-zero location of such 360° all-pass network which may have phase and delay characteristics as shown in FIGS. 7 and 8, respectively.

The transfer function for such 360° all-pass network may generally be expressed as follows:

$$\pm\frac{s^2-2\frac{\omega_c}{b}s+\omega_c^2}{s^2+2\frac{\omega_c}{b}s+\omega_c^2} \tag{7}$$

in which $s=\gamma+j\omega$ is a complex frequency having $\gamma$ as its real and $j\omega$ as its imaginary components, $\omega_c$ is the natural frequency of the network, and $b$ is a constant which defines the phase characteristics of the network. Equating the 360° all-pass function (7) with the circuit function (6) results in the following identity:

$$\pm\frac{s^2-2\frac{\omega_c}{b}s+\omega_c^2}{s^2+2\frac{\omega_c}{b}s+\omega_c^2}\equiv\left[1-\left(\frac{a+1}{a}\right)G(s)\right] \tag{8}$$

Solving Equation 8 for $G(s)$ results in two possible solutions:

(a) $$G(s)=\left(\frac{2a}{a+1}\right)\frac{2\frac{\omega_c}{b}s}{s^2+2\frac{\omega_c}{b}s+\omega_c^2} \tag{9}$$

and (b) $$G(s)=\left(\frac{2a}{a+1}\right)\frac{s^2+\omega_c^2}{s^2+2\frac{\omega_c}{b}s+\omega_c^2} \tag{10}$$

$G(s)$ is therefore realizable in two different forms, each realization being in terms of a positive transfer function, whose Equations 9 and 10 represent second degree band-pass and band-elimination filters, respectively.

FIG. 2 is a block diagram of an active RC shaping network 13 which has a transfer function $+G(s)$ and which comprises passive RC filter 20 and noninverting isolation amplifier 21. The form of the transfer function is principally determined by the passive RC filter 20 together with the feedback arrangement of amplifier 21 in which the amplifier provides the required isolation and versatility of the circuit arrangement.

Figure 3:
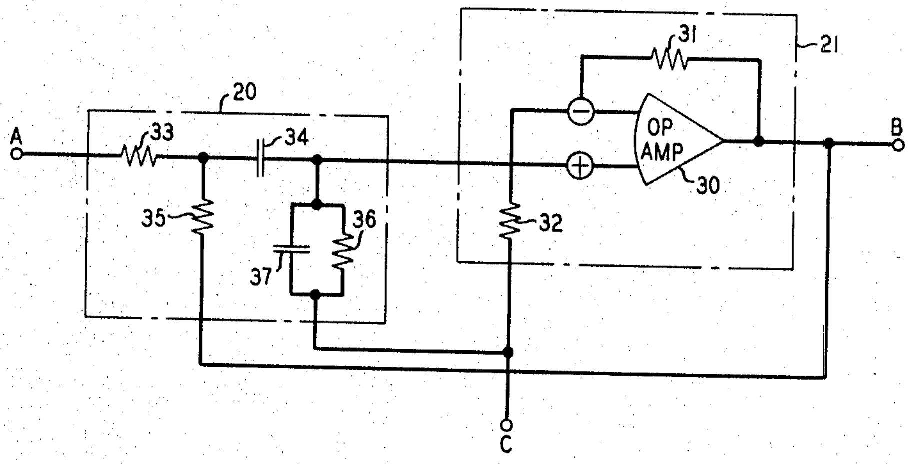
FIG. 3 is a schematic diagram of one type of passive RC filter and operational amplifier which may be used as the active RC shaping network in the embodiment of the invention of FIG. 1.
Figure 4:
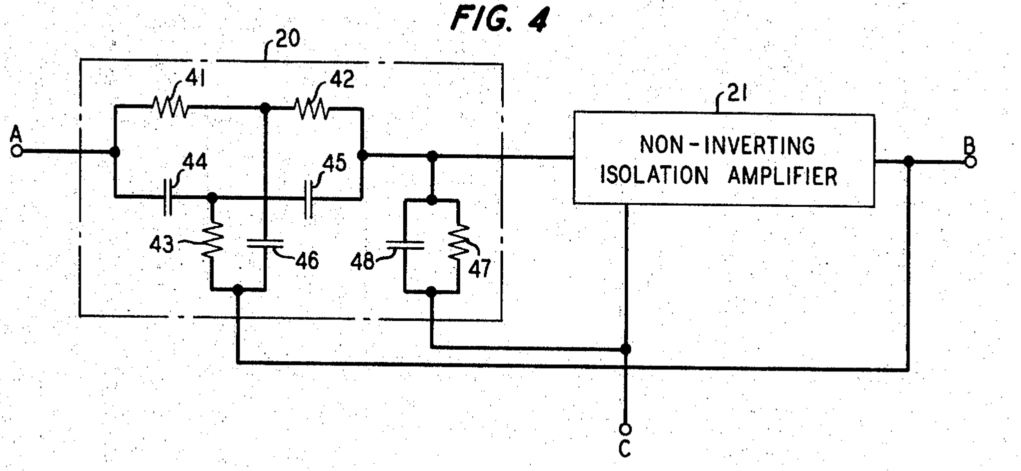
FIGS. 4 and 5 illustrate additional RC passive filter networks which may be used in the active RC shaping network of the present invention.
Figure 5:
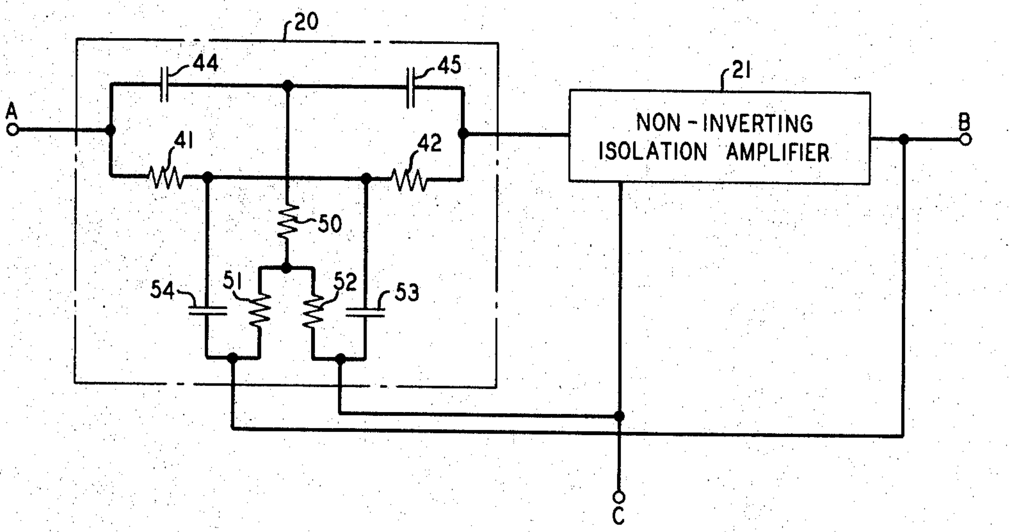

FIGS. 3, 4, and 5 are specific embodiments of RC shaping network 13 each of which produces the required positive transfer function. In the embodiment of FIG. 3 noninverting isolation amplifier 21 has been replaced by an operational amplifier 30 together with a divider network comprising resistors 31 and 32. Filter 20 of FIG. 3 receives its input through resistor 33 and couples its output through capacitor 34 to the positive input terminal of operational amplifier 30. Resistor 33 and capacitor 34 have their other terminals connected together and coupled through resistor 35 to the output of operational amplifier 30 to provide for a positive feedback connection. Without the feedback connection, that is, with resistor 35 being returned to circuit common of the wave transmission network as represented by point C, the transfer function of the shaping network is limited to negative real poles, while the feedback connection makes it possible to obtain complex poles as well. The parallel combination of resistor 36 and capacitor 37, connected from the juncture of capacitor 34 and the positive input terminal of operational amplifier 30 to circuit common of the wave transmission network, is an additional part of passive RC filter 20 necessary to make the active RC shaping network 13 have the required band-pass characteristic.

Figure 12:
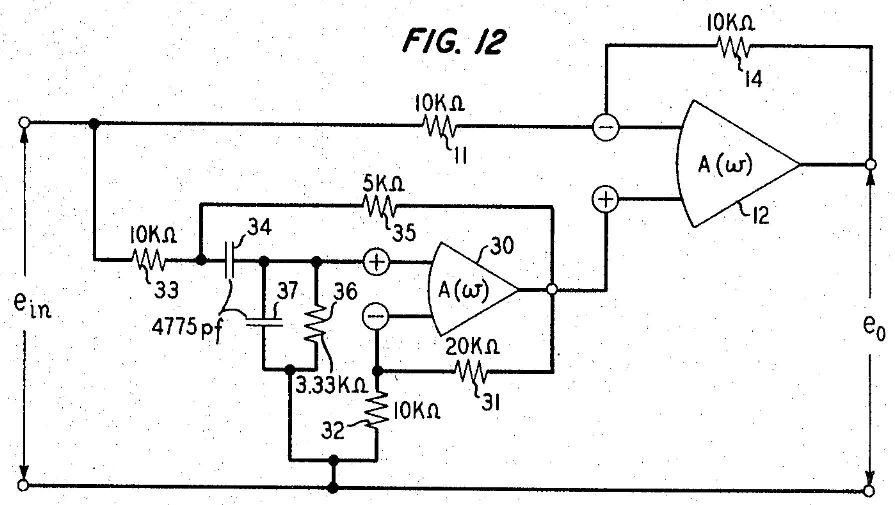
FIG. 12 is a schematic diagram of a specific 360° all-pass network incorporating the RC shaping network shown in FIG. 3.

FIG. 12 is a schematic diagram of a specific 360° all-pass network incorporating the RC shaping network arrangement of FIG. 3. Although the passive RC filter illustrated in FIG. 12 has band-pass filter characteristics, embodiments of the invention are not limited to this category of filters but may incorporate band-elimination filters as well. FIGS. 4 and 5 illustrate the use of band-elimination characteristics by employing parallel-T RC filters in the active RC shaping network to obtain the desired 360° nonminimum phase transfer characteristics for the wave transmission network.

In FIG. 4 passive RC filter 20 has resistors 41, 42, and 43 as well as capacitors 44, 45, and 46 interconnected in the conventional manner to form a parallel-T network which, in turn, is connected in tandem with isolation amplifier 21. The common arm of the parallel-T filter is connected to provide for the required feedback by returning the juncture of resistor 43 and capacitor 46 to the output of isolation amplifier 21. Resistor 47 and capacitor 48 are connected from the juncture of the output of passive filter 20 and the input of isolation amplifier 21 to circuit common to reduce the input signal amplitude to noninverting isolation amplifier 21. As a result, an operational amplifier having a gain greater than one may be used as the noninverting isolation amplifier in the embodiment of the invention illustrated in FIG. 4. In an alternate embodiment of the invention the parallel combination of resistor 47 and capacitor 48 may be replaced by the series arrangement of a resistor and a capacitor.

With resistor 47 and capacitor 48 removed from the embodiment of the present invention illustrated in FIG. 4, active RC shaping network 13 requires a noninverting isolation amplifier which has a gain of less than one to assure operating stability of the network. In order to be able to use an operational amplifier of the general type, i.e., one having a gain greater than one, to perform the required noninverting isolation function, it is necessary to add the parallel combination of resistor 47 and capacitor 48 at the input of the operational amplifier as illustrated in FIG. 4. The resistor/capacitor combination reduces the effective overall gain of the shaping network by reducing the input signal amplitude to the amplifier, thereby assuring its operating stability.

This required addition of resistor 47 and capacitor 48, however, increases the total amount of resistance and capacitance in the circuit by the value of the two components. Although these additions in resistance and capacitance may not be important in conventional circuits, they become very significant in integrated circuit applications, particularly so when the networks are to be produced on thin-film substrates.

FIG. 5 illustrates an active RC shaping network in which the passive RC filter has been redesigned to optimize its application to integrated circuits. Although the passive RC filter networks of FIG. 4 and FIG. 5 are equivalent in their operating characteristics, their structure and some component values have been altered. In the passive filter of FIG. 5 components which are identical to those of FIG. 4 have retained the same numerical designations, whereas resistor 43 has been replaced by resistors 50, 51, and 52, and capacitors 53 and 54 take the place of capacitor 46, whereas resistor 47 and capacitor 48 have been eliminated altogether. Since large values of capacitances often take up most of the substrate area and, therefore, constitute the dominating space factor, an optimization of capacitance is most desirable in integrated circuit applications. It is also desirable, however, to optimize resistance values, although their effects on integration are usually only secondary.

In the circuit illustrated in FIG. 5 this optimization has been obtained by assigning the following values to the new components, where the new component values have been expressed in terms of the replaced components, in which K is any positive constant greater than 1:

$$C_{54}=\frac{C_{46}}{K} \qquad (11)$$

$$C_{53}=C_{46}\left(\frac{K-1}{K}\right) \qquad (12)$$

The total capacitance of the passive RC filter has now been reduced to be equal to the capacitance of former capacitor 46—even though two capacitors $C_{53}$ and $C_{54}$ are in the circuit—that is, the additional capacitance of capacitor 37 which was formerly required has been totally eliminated. The total resistance value, on the other hand, varies as a function of the value of the conversion constant K and may be optimized to a total resistance value of at most twice the resistance of resistor 43, which is still less than the resistance required for the previous method. The selection of the individual resistors is governed by the following design table:

(13)

| K | $R_{50}$ | $R_{52}$ | $R_{51}$ |
|---|---|---|---|
| $1<K\geq 2$ | $\frac{K}{2K-1}(R_{43})$ | $=R_{50}$ | $\frac{K-1}{2K-1}(R_{43})$ |
| $K>2$ | $\frac{K}{K+1}(R_{43})$ | $\frac{K}{K_2-1}(R_{43})$ | $=R_{50}$ |

When in the design of a particular active RC shaping network an unwanted phase shift is introduced due, for example, to excess phase shifts in the amplifier, the gain as well as the phase characteristics of the overall wave transmission network are detrimentally affected. These effects are particularly undesirable when they affect the gain of an all-pass network by varying its gain as a function of frequency instead of holding it constant over the frequency band.

Such an excess phase shift of RC shaping network 13 present at the positive input terminal of the differential amplifier 12 may be compensated for by introducing an equal phase shift in the input signal present at the negative input terminal of the amplifier. Because of its differential input characteristics, the differential amplifier cancels these two equal phase components to eliminate the effects of the initial, unwanted phase component of the RC shaping network.

The required phase shift compensating signal component may be generated by modifying either RC network 11, or feedback network 14, or both networks together. That is, in each case an RC network is included which injects at the negative input terminal of the differential amplifier a signal which has a phase component equal to the undesired phase component present at the positive input terminal to cause the latter's cancellation in the differential amplifier.

It is to be understood that the above-described arrangements are illustrative of the application of the principles of the invention. Numerous other arrangements may be devised by those skilled in the art without departing from the spirit and scope of the invention.

What is claimed is:

1. A wave transmission network having a 360° nonminimum phase transfer function comprising an active resistor-capacitor shaping network having a positive transfer function of the second order, a passive input resistor-capacitor shaping network having a positive transfer function of the first order, the inputs of said active resistor-capacitor and passive resistor-capacitor networks being connected together to receive the input signal to said wave transmission network, a high gain subtracting amplifier having a first input connected to the output of said passive resistor-capacitor network, a second input connected to the output of said active resistor-capacitor shaping network, and an output connected to the output of said wave transmission network, and a negative feedback path connecting the output of said amplifier to at least one of said first and second inputs of said amplifier, whereby said wave transmission network has a 360° nonminimum phase transfer function without the use of inductors.

2. A wave transmission network having a 360° nonminimum phase transfer function comprising an active resistance-capacitance shaping network having a positive transfer function, a resistance-capacitance input network, and a differential amplifier, said differential amplifier having an output and first and second differential input means for receiving first and second input signals, respectively, a feedback network connected between said output and said first differential input means of said differential amplifier to provide negative feedback, said input network and said active shaping network having their respective input terminals connected together to receive an input signal applied to said wave transmission network, and said first differential input means and said second differential input means being connected to the output terminals of said input network and said active shaping network, respectively, whereby said wave transmission network is characterized by a 360° nonminimum phase transfer function without utilizing inductors.

3. A wave transmission network in accordance with claim 2 in which the phase characteristic of said input network corrects for any excess phase shift of the active shaping network, whereby the relative phase shift between the input signals to said first and second differential inputs is optimized.

4. A wave transmission network in accordance with claim 2 in which the phase characteristic of said feedback network of said differential amplifier corrects for any excess phase shift of the active shaping network, whereby the relative phase shift between the input signals to the first and second differential inputs is optimized.

5. A wave transmission network in accordance with claim 2 in which said active shaping network comprises a passive filter network which includes only resistive and capacitive elements, and a first non-inverting isolation amplifier having input and output terminals and being connected in tandem with said passive filter network to isolate said passive filter network from subsequent circuitry, whereby said active shaping network realizes predetermined frequency selective characteristics.

6. A wave transmission network in accordance with claim 5 in which said active shaping network is a band-elimination filter.

7. A wave transmission network in accordance with claim 5 in which said active shaping network is a band-pass filter.

8. A wave transmission network in accordance with claim 5 in which said passive filter network is a parallel-T structure.

9. A wave transmission network in accordance with claim 5 in which said passive filter network comprises first and second resistors and a capacitor and each having one terminal connected to a common point, said first resistor having its other terminal connected to the juncture of said active shaping network and said input network, said capacitor having its other terminal connected to the input of said first amplifier, and said second resistor having its other terminal connected to circuit common of said wave transmission network.

10. A wave transmission network in accordance with claim 5 in which said active shaping network includes in addition means to connect the output of said first amplifier to said passive filter network to provide feedback between said passive filter network and the output of said first amplifier.

11. A wave transmission network in accordance with claim 10 in which said active shaping network is characterized by roots which comprise a plurality of complex zeros and a plurality of negative real poles in the complex frequency plane.

12. A wave transmission network in accordance with claim 10 in which said active shaping network is characterized by rootsw hich comprise a plurality of complex zeros and a plurality of complex poles in the complex frequency plane.

13. A wave transmission network in accordance with claim 10 in which said active shaping network is characterized by roots which comprise a plurality of real zeros and a plurality of complex poles in the complex frequency plane.

14. A wave transmission network in accordance with claim 10 in which said passive filter network comprises first, second, and third resistors, and first and second capacitors, said first and second resistors and said first capacitor each having one terminal connected to a common juncture, said first resistor having its other terminal connected to the juncture of said active shaping network and said input network, said second resistor having its other terminal connected to the output of said first amplifier, said first capacitor having its other terminal connected to a juncture of the input of said first amplifier and one terminal of the parallel combination of said second capacitor and said third resistor, and the other terminal of said parallel combination of said second capacitor and said third resistor being connected to circuit common of said wave transmission network.

15. A wave transmission network in accordance with claim 10 in which said passive filter network comprises a parallel-T structure having an input, an output, and a common terminal, said parallel-T structure having said input terminal connected to the juncture of said input network and said active shaping network, said output terminal connected to the input of said first amplifier, and said common terminal connected to the output of said first amplifier, and attenuating means connected between said parallel-T structure and circuit common of said wave transmission network to reduce the gain of said active RC shaping network, thereby assuring the stability of said wave transmission network.

16. A wave transmission network in accordance with claim 15 in which said attenuating means comprises a parallel resistance-capacitance network having one terminal connected to the juncture of said parallel-T structure and said first amplifier, and another terminal connected to circuit common of said wave transmission network.

17. A wave transmission network in accordance with claim 15 in which said attenuating means comprises a series resistance-capacitance network having one terminal connected to the juncture of said parallel-T structure and said first amplifier, and another terminal connected to circuit common of said wave transmission network.

18. A wave transmission network in accordance with claim 15 in which said parallel-T structure comprises a first and second capacitor connected in series between said input and output terminals, the series combination of a first and second resistor connected in parallel with said first and second capacitors, a third capacitor connected from the juncture of said first and second resistors to said common terminal and a third and fourth resistor connected in series between the juncture of said first and second capacitors and said common terminal, said attenuating means comprising a fifth resistor and fourth capacitor each having one terminal connected to circuit common of said wave transmission network, said fifth resistor having its other terminal connected to the juncture of said third and fourth resistors, and said fourth capacitor having its other terminal connected to the juncture of said first and second resistors, whereby the gain optimization of said active RC shaping network is accomplished without increasing the capacitance and with a minimum increase in resistance.

References Cited

UNITED STATES PATENTS

| | | | |
|---|---|---|---|
| 2,549,065 | 4/1951 | Dietzold | 333—70 |
| 2,946,016 | 7/1960 | Meyer | 330—69 |
| 3,026,480 | 3/1962 | Usher | 333—28 |
| 3,322,970 | 5/1967 | Batteau | 328—155 |

DONALD D. FORRER, Primary Examiner

H. A. DIXSON, Assistant Examiner

U.S. Cl. X.R.

328—158, 138; 330—69; 333—70